(12) United States Patent
So et al.

(10) Patent No.: US 6,432,151 B1
(45) Date of Patent: Aug. 13, 2002

(54) PREPARING METHOD OF SILICA SLURRY FOR WAFER POLISHING

(75) Inventors: Jae Hyun So, Taejeon; Min Ho Oh, Incheon; Sun Hyuck Bae, Taejeon; Seung Man Yang, Taejeon; Do Hyun Kim, Taejeon, all of (KR)

(73) Assignee: Korea Advanced Institute of Science and Technology (KR)

( * ) Notice: Subject to any disclaimer, the term of this patent is extended or adjusted under 35 U.S.C. 154(b) by 68 days.

(21) Appl. No.: 09/644,018

(22) Filed: Aug. 22, 2000

(30) Foreign Application Priority Data

Aug. 28, 1999 (KR) .............................................. 99-36126

(51) Int. Cl.[7] .............................. C09K 3/14; C09G 1/02
(52) U.S. Cl. ............................. 51/308; 106/3; 423/335; 423/336; 423/339; 516/79; 516/86
(58) Field of Search .............................. 51/308; 106/3; 438/692, 693; 423/335, 339, 336; 516/79, 86

(56) References Cited

U.S. PATENT DOCUMENTS

| | | | | |
|---|---|---|---|---|
| 4,940,571 A | * | 7/1990 | Su et al. ...................... | 423/338 |
| 5,017,354 A | * | 5/1991 | Simms et al. ................ | 423/338 |
| 5,230,833 A | * | 7/1993 | Romberger et al. ........... | 51/308 |
| 5,395,604 A | * | 3/1995 | Harris et al. ................ | 423/338 |

* cited by examiner

*Primary Examiner*—Michael Marcheschi
(74) *Attorney, Agent, or Firm*—Martine & Penilla, LLP (57) ABSTRACT

Disclosed herein is a method of preparing silica slurry for wafer polishing. This method includes pre-treating relatively inexpensive and commercially available fumed or colloidal silica particles as a seed by a settling, a crushing using a ball mill and a paint shaker, and a sonication to produce an aqueous dispersion of the silica particles. The pre-treated silica particles are then combined with tetraethylorothosilicate as a precursor, an alcohol solvent and a base, and grown to a desired size by hydrolysis and polycondensation of the precursor, tetraethylorothosilicate. Then, the alcohol solvent, in which the silica particles are grown, are displaced with water by a vacuum distillation. The resulting aqueous dispersion of the grown silica dispersion is hydrothermally treated in an autoclave. Thus, this method allows the economical preparation of the spherical silica particles having a highly uniform size and a very high purity.

6 Claims, 7 Drawing Sheets

| | SRAG | SRLG | SRMix |
|---|---|---|---|
| Removal Rate | (0.3677 μm/min) | (0.3195 μm/min) | (0.3567 μm/min) |
| RMS roughness | 35.9 | 19.1 | 33.1 |
| Average roughness | 29.3 | 14.6 | 24.6 |
| Analytic Result of AFM (Atomic force microscopy) |  |  |  |

FIG. 7

PREPARING METHOD OF SILICA SLURRY FOR WAFER POLISHING

BACKGROUND OF THE INVENTION

1. Field of the Invention

The present invention relates in general to a preparing method of silica slurry for use in wafer polishing. More particularly, the present invention relates to a method of preparing silica slurry for wafer polishing by allowing commercially available silica particles as a seed to be grown. This method provides the slurry of silica particles having improvements with respect to a shape irregularity and a size limitation with silica particles prepared by a commonly used method in the prior art, such as a vapor phase method or a precipitation method among others.

2. Description of the Prior Art

A dispersed system of particles having a uniform size and shape is used in very wide applications such as catalysts, fine ceramics, paints, drugs, and the like, and thus is very high in its industrial value-added. A monodisperse system having high phase stability has advantages of uniform optical and magnetic colloidal properties. For these reasons, many studies have been conducted to prepare particles having a uniform size distribution of a few micrometers to a few nanometers.

Moreover, a sol-gel method, which is much studied in an area of inorganic materials, advantageously provides particles that are excellent in chemical uniformity in a multi-component system while having high specific surface area even at relatively low sintering temperatures.

Polymerization of tetraethylorthosilicate (hereinafter, referred to as TEOS) by the sol-gel method varies as an acid or base catalyst being used. Generally, the use of the acid catalyst produces gels of the three-dimensional network structure other than the growth into particles, whereas the use of the base catalyst, commonly ammonia or ammonium hydroxide, provides spherical particles.

Studies to prepare monodisperse spherical particles using the sol-gel method have been performed by many researchers. Stober, et al. have described the preparation of spherical particles of a uniform size by hydrolysis and polycondensation of tetraalkoxysiliane in an alcohol solvent in the presence of a base [See, J. Colloid & Interface Sci. 26, 26–62 (1968)]. However, the spherical silica particles thus prepared are disadvantageous in that they are very low in their weight fraction, and TEOS ($(Si(OC_2H_5)_4)$), a reactant, is very expensive. For this reason, these silica particles are hardly used in industrial applications, and are used only in limited, special applications, such as model particles for a study or experiment.

Since the study by Stober, et al., there have been studied effects of various variables on the Stober's reaction, such as concentrations of tetraalkoxysilane, water and ammonia, and reaction temperature.

Bogush, et al. have reported a growth of silica particles and an increase in their weight fraction by hydrolysis and polymerization of TEOS using the silica particles prepared by Stober, et al., as a seed [See, J. Non-Cryst. Solids. 104, 95–106 (1988)]. Moreover, they have presented a correlation between a concentration of each of reactants and a particle size. The correlation equation was obtained through the growth reaction of particles using various concentrations of TEOS, ammonia and water.

In addition, Coenen et al. have reported the preparation of a silica particle-dispersed system of more uniform size using colloidal silica particles (commercially available under Ludox AS-40) as a seed [See, J. Colloid & Interface Sci., 124, 104–110 (1988)]. However, the particles prepared by this sol-gel method have the following two problems. First, they are low in their concentration in the dispersed system. Second, they must be dispersed in an aqueous solution again, because of the use of an alcohol solvent.

Meanwhile, a commercially available Ludox prepared by a precipitation method is composed of very small silica particles in which primary particles are about 20 nm in size. Also, the Ludox has a relatively wide size distribution as compared to that of particles prepared by the sol-gel method. Moreover, fumed silica prepared by the vapor method has disadvantages of a primary particle size of less than 40 nm, a wide particle size distribution, and an irregular particle shape.

SUMMARY OF THE INVENTION

We have conducted a study to resolve the problem of low production efficiency that is a drawback of the sol-gel method and to prepare monodisperse silica particles of a desired size. As a result, we have found a method capable of preparing a silica slurry for wafer polishing, which method comprises pre-treating commercially available fumed or colloidal silica particles having a size of several tens nm so that these particles can be uniformly grown in a subsequent particle growth step; allowing the seed silica particles to grow by a sol-gel method; and post-treating the grown silica particles so that these grown particles can be used for wafer polishing. Based on this discovery, we have perfected the invention.

It is therefore an object of the present invention to provide a preparing method of a silica slurry, which comprises growing relatively inexpensive and commercially available fumed or colloidal silica particles as a seed by hydrolysis and polycondensation of TEOS, thereby overcoming drawbacks of the Stober's method.

It is other object of the present invention to provide a preparing method of silica slurry, which comprises using seed particles of a desired size of various sizes while controlling the amount of reactants, thereby allowing grown silica particles of a desired size to be prepared.

It is another object of the present invention to provide silica slurry capable of being used to polish silicon wafers of to various shapes, sizes and surface roughness.

It is still object of the present invention to provide silica slurry capable of being used in a chemical mechanical polishing process for the semiconductor fabrication.

To accomplish the above objects, the present invention provides a method of preparing a silica slurry for wafer polishing, comprising the steps of: combining an aqueous dispersion of silica particles as a seed, TEOS as a precursor, an alcohol solvent, and a base; growing the seed silica particles by hydrolysis and polycondensation of the precursor TEOS; displacing the alcohol solvent containing the grown silica particles dispersed therein with an aqueous solution by a vacuum distillation; and hydrothermally treating the resulting dispersion of the silica particles.

BRIEF DESCRIPTION OF THE DRAWING

The above and other objects and aspects of the invention will be apparent from the following description of embodiments with reference to the accompanying drawings, in which:

FIG. 4a is a micrograph showing seed colloidal silica particles (Ludox AS-40) that were not pre-treated, FIG. 4b is a micrograph showing silica particles prepared by a reaction of 180 ml of TEOS with the seed colloidal silica particles of FIG. 4a, and FIG. 4c is a micrograph showing silica particles prepared by an additional reaction of 120 ml of TEOS with the silica particles of FIG. 4b;

FIG. 5a is a micrograph showing silica particles prepared by a reaction of 180 ml of TEOS with pre-treated colloidal silica particles, and FIG. 5b is a micrograph showing silica particles prepared by an additional reaction of 120 ml of TEOS with the silica particles of FIG. 5a;

DETAILED DESCRIPTION OF THE INVENTION

The present invention is a preparing method of silica slurry that can be used for polishing and planarization of a silicon wafer. In this method, fumed silica particles or colloidal silica particles are used as a seed, and TEOS is used as a precursor. The precursor TEOS is subjected to hydrolysis and polycondensation to grow the seed silica particles, thereby giving spherical silica particles of a uniform size. The spherical silica particles are then dispersed in an aqueous solution, and subjected to post-treatment using additives.

The fumed silica particles are very high in their rigidity as they are prepared at high temperatures. Also, the colloidal silica particles that are made mainly by the precipitation method have a density of 2.2 g/ml which is higher than that of silica particles prepared by hydrolysis and polycondensation of a normal silicon alkoxide precursor (1.8 to 1.6 g/ml), and thus possess a rigid structure. For these reasons, these silica particles can show a relatively high mechanical polishing capability when used in a polishing process of silicon wafers. As a result, in order for the silica particles produced by the hydrolysis and polycondensation of TEOS to be used in the silicon wafer polishing process, they must be subjected to a post-treatment so as to make them a rigid, solid structure.

The present invention aims at the preparation of spherical silica particles having a size of less than 1 micrometer, and thus needs to carry out a reaction at high pH's. Accordingly, hydrolysis and polycondensation of TEOS are conducted which are represented by the following known reaction equations:

$$Si(OC_2H_5)_4 + 4H_2O \rightarrow 2Si(OH)_4 + 4C_2H_5OH$$

$$Si(OH)_4 \rightarrow 2SiO_2 + 2H_2O$$

Where the fumed silica particles are used as a seed, a concentration and dispersability of the fumed silica particles and the amount of TEOS used in the particle growth reaction have a significant effect on a shape, size, size distribution and weight fraction of the resulting grown silica particles. An example of the fumed silica particle, which can be used in the present invention, is Aerosil OX-50 commercially available from Degussa Co.

For the preparation of the silica slurry for wafer polishing using the fumed silica particles as a seed, solid fumed silica particles are first dispersed in distilled water. At this time, the fumed silica particles are agglomerated together without being easily dispersed to a sufficient degree. Thus, it is necessary for the particles to be pre-treated sufficiently, before being subjected to the particle growth reaction.

For this pre-treatment, the fumed silica particles (Aerosil OX-50) are dispersed in water and settled for a lengthy period of time of one week to ten days, thereby settling the very large agglomerated particles. Then, the supernatant liquid is isolated and mixed in a paint shaker of zirconia balls of 0.5 mm in diameter. The mixture is intensively stirred using the paint shaker for about 3 to 5 hours, and preferably 4 hours, to uniformly crush the agglomerated fumed silica particles. The Aerosil OX-50 dispersion thus treated is sonicated for about 10 minutes to 30 minutes, and preferably 25 minutes to 30 minutes, using ultrasonic waves.

The fumed silica particles that were uniformly dispersed in distilled water by the pre-treatment are preferably maintained at a concentration of 0.002 g/l to 0.2 g/l in distilled water. Then, for a particle growth reaction, an alcohol solvent is preferably used at the volume of four times as much as the aqueous dispersion of the fumed silica particles. Examples of the solvent that can be used include methyl alcohol, ethyl alcohol, propanol, butanol, mixtures thereof, and the like. Ethyl alcohol is most preferably used.

Ethyl alcohol as the solvent is charged into a reactor and set at a temperature of 25° C. using a thermostat. To which, ammonium hydroxide is added so that the pH reaches about 11 to 11.5. Then, the aqueous dispersion of the fumed silica particles pretreated as described above is added, after which TEOS is added in the amount such that a molar ratio of TEOS to the fumed silica particles is in the range of 1 to 2. TEOS is then allowed to react (hydrolysis and polycondensation) for about 8 hours to grow the seed silica particles. Although the total amount of TEOS may be added at one time, it is preferred for the production of silica particles of a more uniform size that the addition of TEOS is carried out two or three times for the total amount thereof. Also, to prevent a gelation phenomenon due to a too high concentration of silicic acid during the reaction and to make the particle growth uniform, it is preferred to gradually decrease the adding amount of TEOS. This particle growth method using the fumed silica particles as a seed as above described can provide an increase by two or three times in weight fraction of the resulting silica particles.

Meanwhile, where the colloidal silica particles are used as a seed, a concentration and dispersability of the colloidal silica particles and the amount of TEOS used in the particle growth reaction have a significant effect on a shape, size, size distribution, weight fraction and the like of the resulting silica particles. An example of the colloidal silica particle which can be used in the present invention is Ludox AS-40 commercially available from Dupont Co.

For the preparation of the silica slurry for wafer polishing using the colloidal silica particles as a seed, the commercial dispersion of the colloidal silica particles is first diluted in distilled water. At this time, the colloidal silica particles are agglomerated together without being easily dispersed to a sufficient degree. Thus, it is necessary to pre-treat the particles sufficiently, before carrying out the particle growth reaction. The colloidal silica particles are present in the form already dispersed in water and thus are relatively excellent in their dispersability as compared to the fumed silica particles above described. For this reason, it is preferred that the aqueous dispersion of the colloidal silica particles is diluted in distilled water having the volume of one to two times, and preferably 1.67 times, as much as the silica particle dispersion. Also, upon the dilution with distilled water, to prevent a reduction in an electrostatic repulsive force, it is desirable to add aqueous solution of ammonium hydroxide at the amount of 5 to 10% by volume, and preferably about 6.7% by volume relative to the volume of the colloidal silica solution.

The colloidal silica particle-dispersed aqueous solution thus diluted is sonicated for about 10 minutes to 30 minutes, and preferably 25 minutes to 30 minutes, using ultrasonic waves, so that the silica particles are separated into individual primary particles.

The colloidal silica particles that were uniformly dispersed in distilled water by the pre-treatment as above described are used as a seed in the subsequent particle growth reaction. For this particle growth reaction, an alcohol solvent is preferably used at the volume of four times as much as the colloidal silica aqueous solution. Examples of the solvent that can be used include methyl alcohol, ethyl alcohol, propanol, butanol, mixtures thereof, and the like. Ethyl alcohol is most preferably used.

Ethyl alcohol as the solvent is first charged into a reactor and set at a temperature of 25° C. using a thermostat. To which, ammonium hydroxide is added so that the pH of the solvent reaches about 11 to 11.5. Then, the aqueous solution containing the colloidal silica particles pretreated as described above is added, after which TEOS is added in the amount such that a molar ratio of TEOS to the silica is in the range of 1 to 2. TEOS is then allowed to react (hydrolysis and polycondensation) for about 8 hours to grow the silica particles. Although the total amount of TEOS may be added at one time, it is preferred for the production of silica particles of a more uniform size that the addition of TEOS is carried out two or three times for the total amount thereof. Also, to prevent gelation due to a too high concentration of silicic acid during the reaction and to make the particle growth uniform, it is preferred to gradually decrease the adding amount of TEOS. The particle growth method using the fumed silica particles as a seed as above described can increase the weight fraction of the resulting silica particles by about three to five times. The preparation of particles using the prior sol-gel method causes two problems in that the resulting particles are low in their concentration and need to be dispersed in aqueous solution again due to the use of the alcohol solvent. To solve these problems, the present invention displaced the ethanol solvent having the silica particles dispersed therein with an aqueous solution using a vacuum evaporator and an ultracentrifuge. It could be found that the silica particles, after the vacuum distillation, were somewhat increased in their size and slightly agglomerated together. In particular, it could be confirmed through a variation in pH that the ammonium hydroxide was significantly removed, which had been added to maintain pH during the vacuum distillation. In this regard, the maintenance of pH is necessary to maintain an electrostatic repulsive force between the particles and to prevent the agglomeration of the particles. Thus, so as to continually prevent a variation in pH at the vacuum distillation carried out for the displacement of the alcohol solvent with water after the particle growth reaction, there must be supplied with an aqueous solution consisting of 5 to 10 ml of ammonium hydroxide added to 1 liter of distilled water, thereby preventing the gelation and particle agglomeration during the vacuum distillation.

A polishing system, which can be used in the present invention, is a Precision Lapping & Polishing Machine Model PM5 that is commercially available from Logitech, Co. and that is a 4", 5" and 6" wafer-exclusive system. This system includes a primary polishing unit performing an actual polishing, a wafer carrier and a slurry feeder.

The primary polishing unit that performs the actual polishing includes a slurry feeder, a platen and a pad conditioner. On the platen, there is attached a pad which is in contact with a wafer upon polishing. The pad is made of polyurethane having appropriate porosity. The pad conditioner serves to eliminate a pad abrasion resulted from the continued polishing, and deformation of the pad and the slurry used on the pad surface. Also, the pad conditioner is in the form of a brush made of polyvinyl resin. The pad conditioner operates every termination of the polishing, with the operation being performed by rotating the pad while applying a load. The wafer carrier is made of stainless steel, and is constituted in such a manner that a vacuum can be applied through the backside of the carrier to mount and release the wafer. The application of the load to the wafer during the polishing is achieved by the use of a weight on the carrier. A (100) type 4" wafer is particularly suitable to be polished according to the present invention. The wafer prior to the polishing is weighed for the measurement of a removal rate of the wafer, after which the wafer is subjected to a standard cleaning 1 (SC1) using $NH_4OH:H_2O_2:H_2O$ (1:1:10) for the removal of particles present on the wafer surface and is then cleaned with distilled water. In order to prevent the cleaned wafer from being dried, it is maintained at a state immersed in DI water.

Moreover, the primary polishing pad, which can be used in the present invention, is Suba 600™ commercially available from Rodel, Co. Before introducing a wafer sample into the system, the pad is stably maintained at a temperature of more than 30 ° C., is trained using the pad conditioner and is sufficiently wet, thereby being cleaned. Also, before the introduction of the wafer sample, the platen is allowed to rotate for 30 minutes for the stabilization of its rotation. After stabilizing the pad temperature and the platen rotation, the wafer sample is charged into the system, and at the same time, the slurry is supplied to the primary polishing pad. Then, the polishing is carried out under the respective experimental conditions. After the polishing, the wafer is polished for one minute with distilled water for its cleaning, and subjected to SC1 treatment to remove the residual particles. Conditioning of the pad is performed for one minute every termination of the polishing.

The silica slurry prepared using the seed according to the present invention mainly serves to effectively remove rough portions of the wafer surface. The flatness of the wafer surface requires a value of 40 to 60 Å, and a main measure for performance evaluation of the slurry is a removal rate, that is, an effectively cut degree of the wafer surface. Accordingly, the present invention adds tetramethylammonium hydroxide (hereinafter, referred to as TMAH) and monoethanolamine as polishing aids to the silica slurry prepared through the particle growth reaction using the fumed or colloidal silica particles as the growing seed as described above, thereby producing silica slurry for use in the polishing of the silicon wafer. In this regard, TMAH and monoethanolamine used as the polishing aids also may serve as a pH-adjusting agent and a bactericidal agent.

The following examples are for further illustration purposes only and in no way limit the scope of this invention.

EXAMPLE 1
Pre-treatment Effect and Growth of Fumed Silica

This example illustrates a particle growth experiment using Aerosil OX-50, fumed silica particles, as a growing seed. To confirm the pre-treatment effect of the seed silica particles, the pre-treated case was compared to the case where the pre-treatment was not performed. The particle growth experiment using the seed silica particles prepared via several steps was carried out using reactants shown in Table 1. The grown silica particles thus obtained were used in a wafer polishing experiment.

Figure 2:
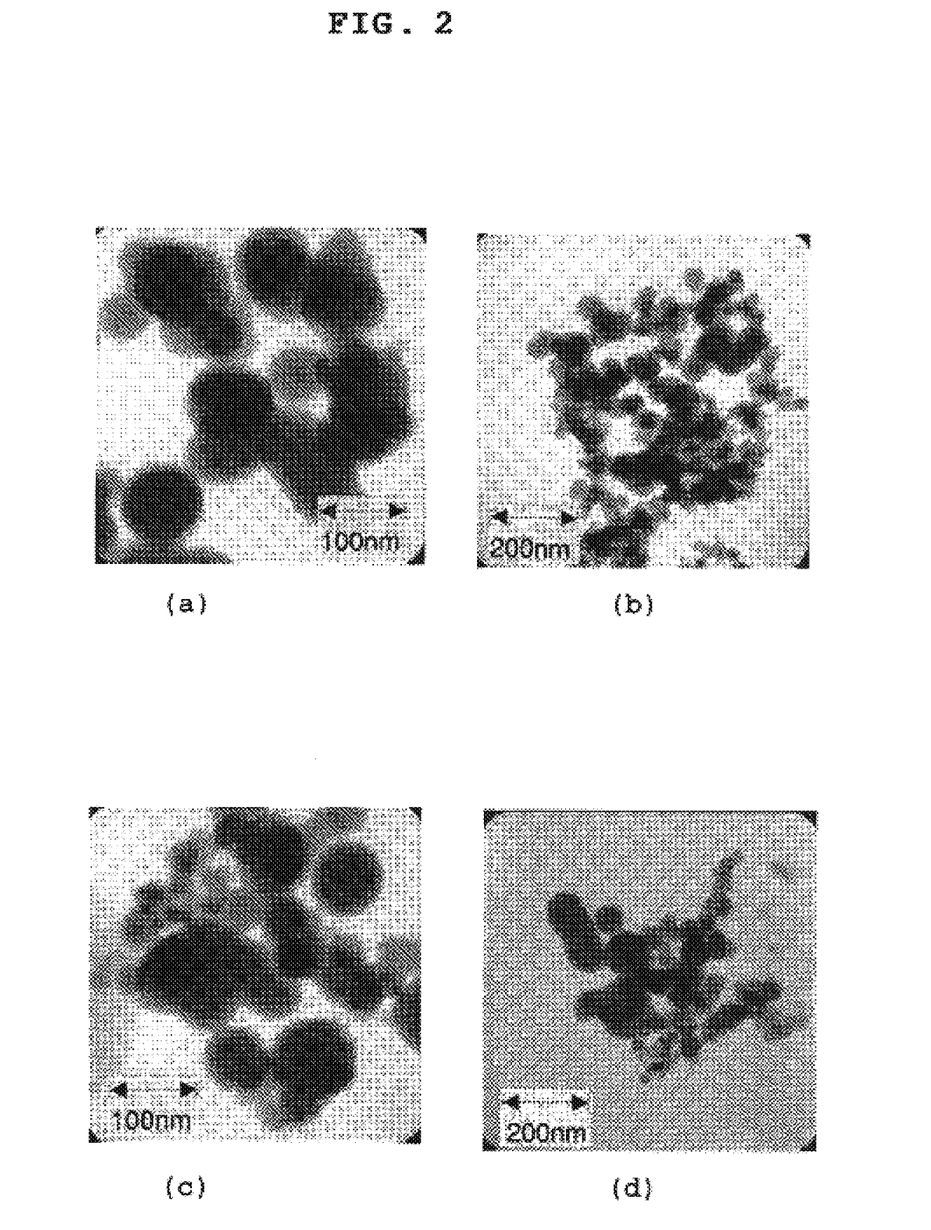
FIGS. 2a and 2b are micrographs showing seed fumed silica particles that were dispersed in water without the pre-treatment.
FIGS. 2c and 2d are micrographs showing fumed silica particles that were grown without the pre-treatment.
Figure 3:
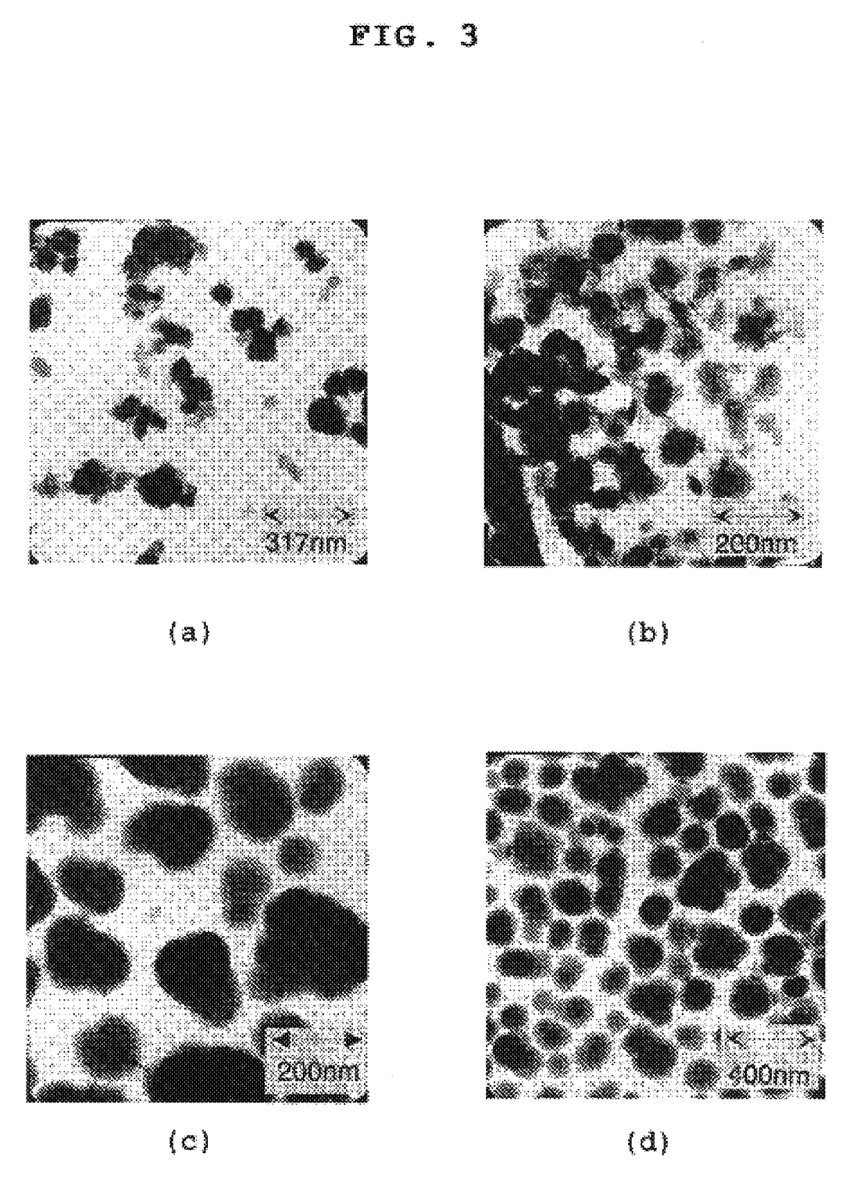
FIG. 3a–3d are micrographs showing 1) seed fumed silica particles that were dispersed in water after the pre-treatment, and 2) fumed silica particles that were grown after the pre-treatment.

Although most of the particle growth reaction is achieved in two or three hours, it was carried out for a sufficient period of 8 hours in this example. The silica particles thus grown were examined with a microscope. Results are shown in FIGS. 2 and 3 depending on whether the pretreatment is carried out or not. FIGS. 2a and 2b are micrographs showing seed fumed silica particles, which were dispersed in water without the pretreatment. FIGS. 2c and 2d are micrographs showing fumed silica particles that were grown without the pretreatment. FIG. 3a–3d are micrographs showing seed 1) fumed silica particles that were dispersed in water after the pretreatment, and 2) fumed silica particles that were grown after the pretreatment. From FIGS. 2 and 3, it could be confirmed that the particles that were pre-treated and the particles that were not pre-treated, were significantly different from each other in their size and shape, and the pretreatment had a significant effect on the size and size distribution of the resulting particles after the growth reaction. This indicates that the pretreatment suggested in the present invention (the free settling, the sonication and the milling by a ball mill) is very effective for a more uniform particle growth.

TABLE 1

Components Used in Particle Growth Reaction
Using Fumed Silica Particles as Seed

| Reactants | Molar Concentration |
| --- | --- |
| Aerosil OX-50 | 0.70 |
| TEOS (Aldrich, 98%) | 4.28 |
| H$_2$O (distilled water) | 0.14 |
| EtOH (Oriental Chemical Inc., Korea) | 28.6 |
| NH$_4$OH (11.4 M) | 10.1 |

EXAMPLE 2
Particle Growth Reaction Using Colloidal Silica Particles as Seed

Figure 5:
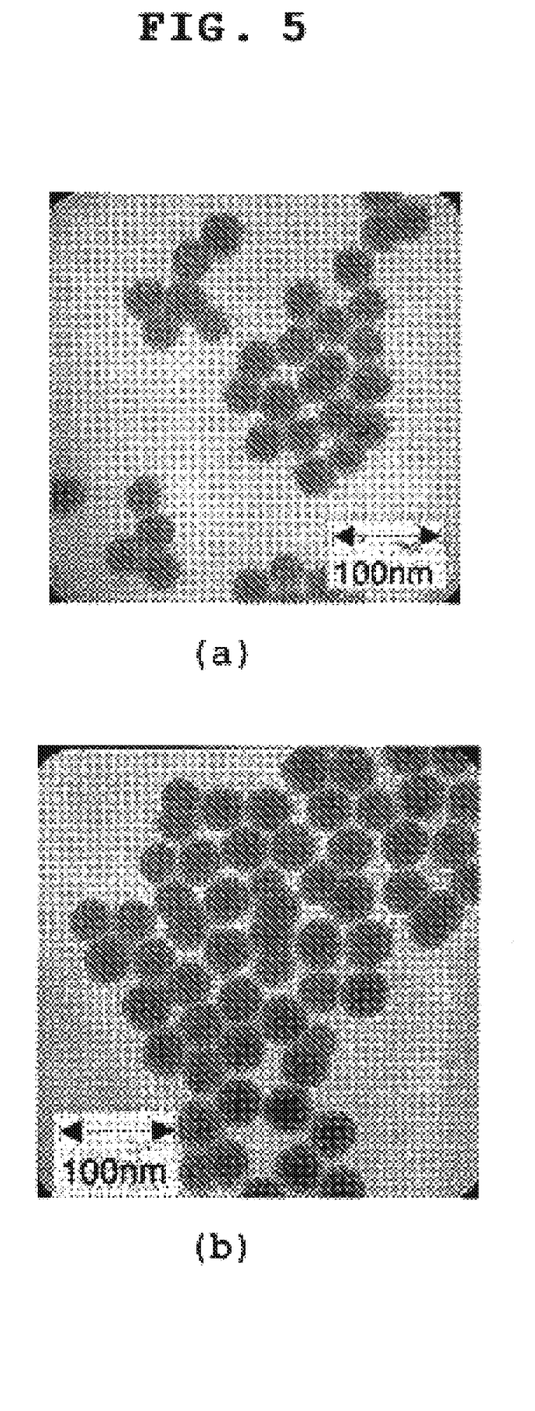

Ludox AS-40, commercially available colloidal silica, has an average diameter of about 18 nm and some particle size distribution. A particle growth experiment using the pre-treated colloidal silica particles as a seed was carried out using components shown in Table 2. For the comparison, a particle growth experiment using fumed silica particles as a seed was also carried out using components shown in Table 2. The resulting particles were examined by an electromicroscope, and the results are shown in FIG. 5. FIG. 5a is a micrograph showing grown silica particles prepared by a reaction of 180 ml of TEOS with the seed silica particles, and FIG. 5b is a micrograph showing grown silica particles prepared by an additional reaction of 120 ml of TEOS with the silica particles of FIG. 5a.

Figure 4:
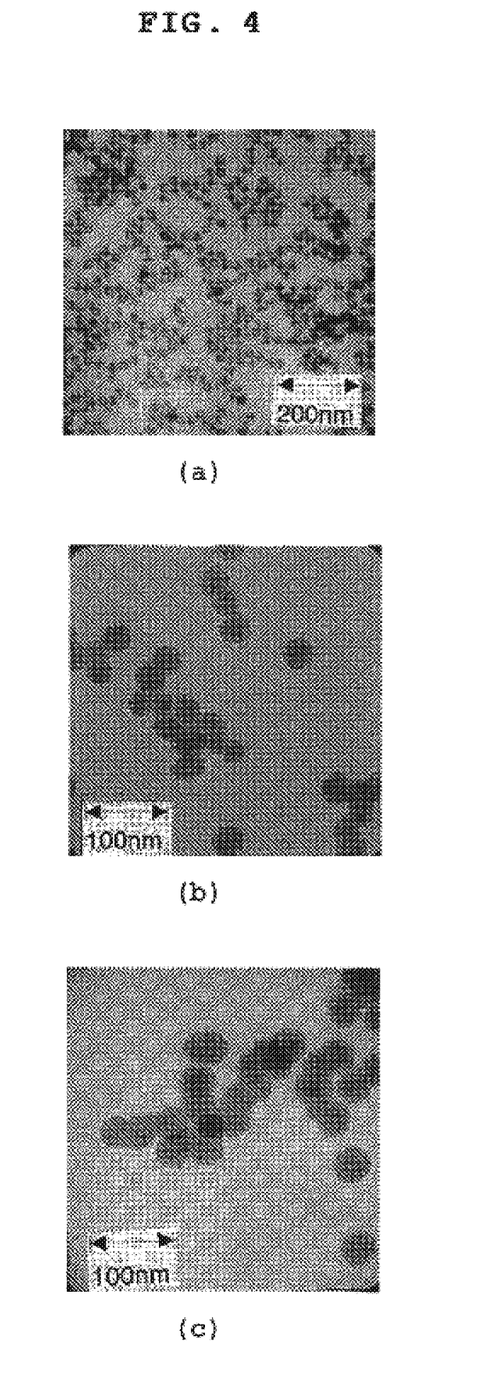

To confirm the effect of the pre-treatment of the seed, a particle growth experiment was also carried out using a seed that was not pre-treated, and the results are shown in FIG. 4. FIG. 4a is a micrograph showing colloidal silica particles (Ludox AS-40) that are used as a seed without the pre-treatment, and FIG. 4b is a micrograph showing grown silica particles prepared by a reaction of 180 ml of TEOS with the seed colloidal silica particles of FIG. 4a. FIG. 4c is a micrograph showing grown silica particles prepared by an additional reaction of 120 ml of TEOS with the silica particles of FIG. 4b.

Generally, Ludox AS-40 has a size of less than 20 nm as shown FIG. 4a. As can be seen from FIGS. 4 and 5, these silica particles were grown to a particle size of about 40 nm by hydrolysis and polycondensation of TEOS, and became more uniform in their particle size distribution.

However, the higher the concentration of the seed, the more the seed particles are increased in their tendency to be agglomerated, and somewhat deteriorated in their growth to a uniform size. Accordingly, to minimize these disadvantages, this example has carried out a particle growth experiment using the same components and method as described above after increasing a dispersability of the seed solution by the sonication. As evident from FIG. 5, the use of the pre-treated seed has resulted in a significant increase in a dispersability of the grown particles, and also provided the growth of the particles more closed to spheres.

TABLE 2

Components used in Particle Growth Reaction
using Colloidal Silica Particles as Seed

| Reactants | Amount | Molar Concentration |
| --- | --- | --- |
| Colloidal Silica (Ludox AS-40) | 60 ml (24g SiO$_2$ + 49.1 ml H$_2$O) | 0.17 M |
| TEOS | 180 + 120 + 60 ml | 0.80 M |
| NH$_4$OH (11.4 M) | 19 ml | 0.09 M |
| EtOH | 1800 ml | 21.15 M |
| H$_2$O (distilled water) | 100 ml | 3.53 M |

EXAMPLE 3
Results of Polishing Using Silica Slurry Particles Before and After Being Subjected to Post-treatment A silicon wafer polishing experiment was carried out using silica slurry prepared by pre-treating the commercially available silica particles and then subjecting the resulting particles to the particle growth reaction using the seed.

As described above, the silica particles prepared by hydrolysis and polycondensation of a general silicon alkoxide precursor hardly have a solid structure, since they are relatively low in density, such as 1.8 to 1.6 g/ml, as compared to the fumed silica particles prepared by the vapor phase method or the colloidal silica particles prepared by the precipitation method. Accordingly, the silica particles prepared by hydrolysis and polycondensation of the silicon alkoxide precursor hardly exhibit a sufficient mechanical performance when being used in a polishing process of the silicon wafer. For this reason, prior to using these silica particles in the silicon wafer polishing process, they need to be post-treated to make them a solid structure. Thus, these silica particles were hydrothermally treated for about 1 to 2 hours in an autoclave to be made physically solid.

Figure 6:
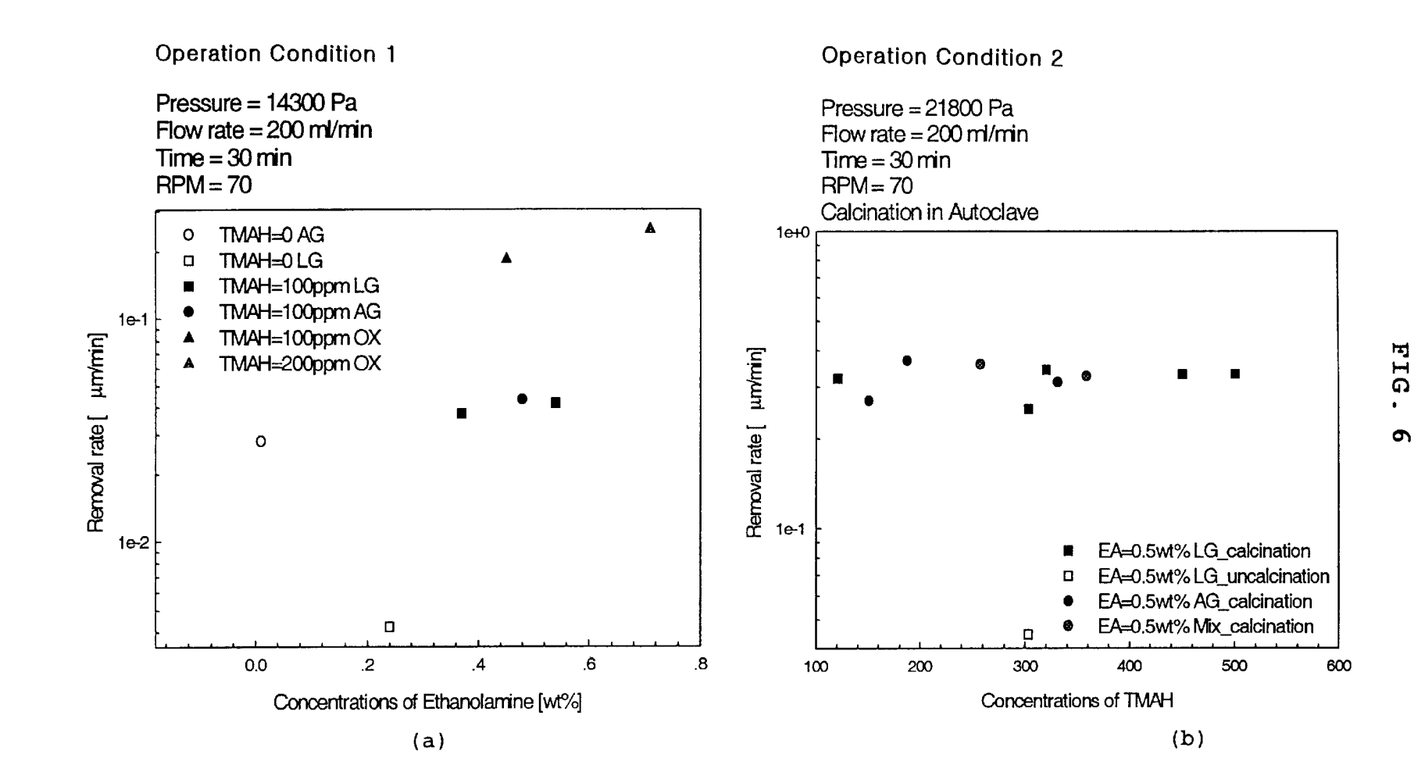
FIG. 6a shows a removal rate of the wafer surface as a function of the concentration of monoethanolamine.
FIG. 6b shows a removal rate of the wafer surface as a function of the concentration of TMAH.

To confirm the effect of this hydrothermal treatment, silicon wafer polishing experiments were conducted using each of a silica slurry that was hydrothermally treated and a silica slurry that was not hydrothermally treated. The polishing experiment results are shown in FIG. 6 showing a removal rate of the silicon wafer surface according to a composition of an additive to the silica slurry. FIG. 6a shows results of the polishing using the silica slurry that was not hydrothermally treated, and FIG. 6b shows a removal rate of the silicon wafer surface by the silica slurry that was hydrothermally treated for 90 minutes in the autoclave.

From the results shown in FIG. 6, it could be confirmed that the removal rate was not significantly influenced by concentrations of additives (monoethanolamine: 0 to 0.8 wt %; TMAH: 100 to 500 ppm) used in the present invention. Accordingly, it could be found that the removal rate of the silicon wafer surface was significantly influenced by a physical strength of the silica particles. Also, it could be confirmed that the removal rate of the wafer surface was shown to be high at the fumed silica slurry (OX) as compared to the silica slurries (AG and LG) that were not hydrothermally treated.

In addition, the effect of the hydrothermal treatment in the autoclave proposed in the present invention can be confirmed from FIG. 6b. The hydrothermally treated silica slurry has exhibited a removal rate higher than the hydrothermally untreated silica slurry by almost ten times.

EXAMPLE 4
Polishing Results of Silicon Wafer Surface Using Silica Slurry

A silica slurry was prepared by pre-treating the commercially available silica particles, growing the pre-treated seed silica particles, and then hydrothermally treating the resulting grown silica particles. A silicon wafer polishing experiment was carried out using the prepared silica slurry, and the polished silicon wafer surface was analyzed for its planarization degree using atomic force microscopy (AFM). Results are shown FIG. 7.

Figure 7:
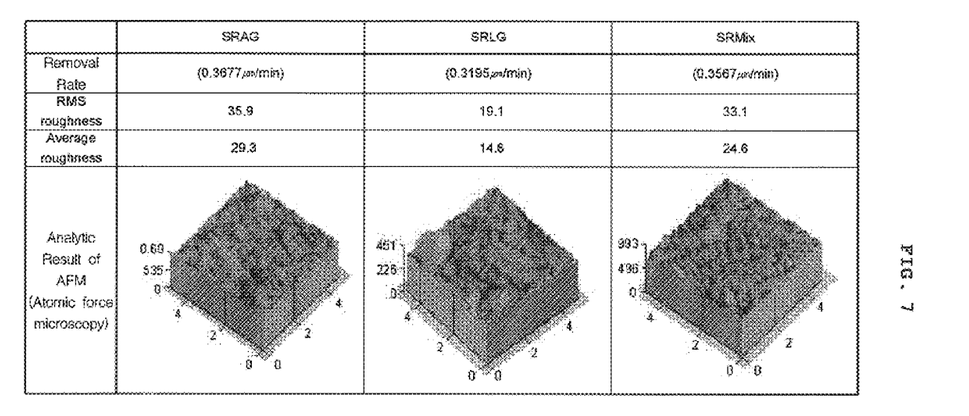
FIG. 7 shows 1) results analyzed for the wafer surface polished by SRAG as a silica slurry, 2) results analyzed for the wafer surface polished by SRLG as a silica slurry, and 3) results analyzed for the wafer surface polished by SRMix as a silica slurry.

In FIG. 7, SRAG represents a silica slurry prepared using the fumed silica particles as a seed, SRLG represents a silica slurry prepared using the colloidal silica particles as a seed, and SRMix represents a silica slurry prepared by mixing SRAG and SRLG at a weight ratio of 1:1. The respective compositions of these slurries are indicated in FIG. 6b.

As can be seen from FIG. 7, the removal rate of the wafer surface was the highest in the case of SRAG having the largest particle size, whereas the planarization degree of the wafer surface was most excellent in the case of SRLG having a small particle size and a uniform particle distribution. Moreover, SRMix, which is a mixture of SRLG and SRAG, was placed between the results for SRAG and the results for SRLG in the removal rate and planarization degree of the wafer surface.

Conditions of SRAG, SRLG and SRMix used in the AFM analysis as described above are shown in Table 3 below.

TABLE 3

Conditions of SRAG, SRLG and SRMix

| Items | SRAG | SRLG | SRMix |
|---|---|---|---|
| Removal rate | 0.3677 μm/min | 0.3195 μm/min | 0.3567 μm/min |
| RMS roughness | 35.9 | 19.1 | 33.1 |
| Average roughness | 29.3 | 14.6 | 24.6 |

Comparative Example
Particle Preparation not Using a Seed

Figure 1:
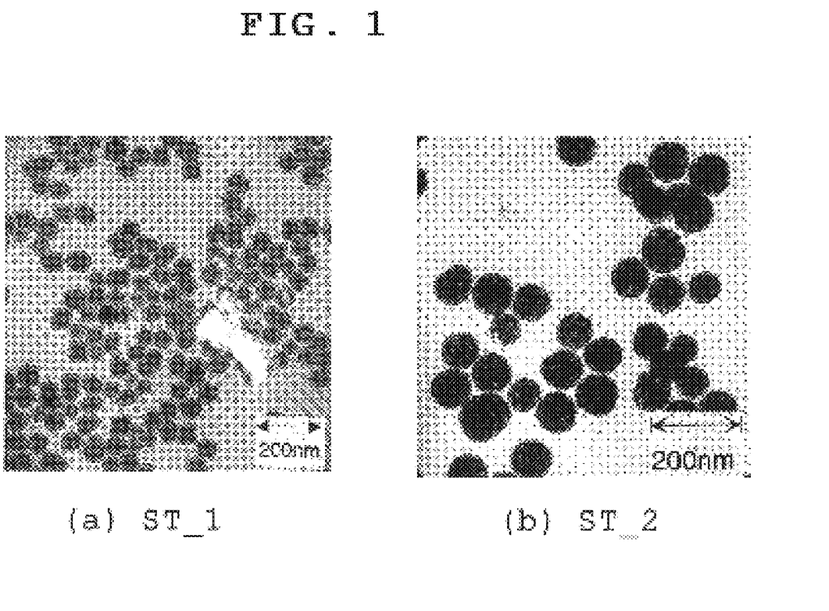
FIGS. 1a and 1b are micrographs showing silica particles prepared by the sol-gel method without the use of a seed.

Table 4 below indicates compositions of reactants for preparing silica particles by hydrolysis and polycondensation of only TEOS not including the use of the seed. FIG. 1 shows a shape and size of the silica particles prepared using the reactants indicated in Table 4 without the use of the seed. In this case, FIG. 1a shows particles prepared using the reactant ST1 in Table 4, and FIG. 1b shows particles prepared using the reactant ST2 in Table 4.

As can be seen in FIGS. 4a and 4b, the size of the prepared silica particles were in proportion to the amount of TEOS used in the reaction. And, the increased TEOS amount and thus the increased particle size indicate a wider particle size distribution. Also, the particles prepared by the sol-gel method with no use of the seed had particle size distributions of 30 to 40 nm and 70 to 90 nm, and were significantly uniform spherical particles. However, the silica particle dispersion prepared by the hydrolysis and polycondensation of only TEOS is difficult to be used in practical commercial applications, since its weight fraction is very low, and TEOS used as the precursor for the reaction is significantly expensive. For this reason, to increase the yield and to lower production costs, it is advantageous for economic efficiency and mass production to perform the particle growth reaction using the commercially available fumed or colloidal silica as a seed.

TABLE 4

Reaction Conditions of Silica Particles
Prepared by Sol-Gel Method not including Use of Seed.

| Reactants | ST1 | ST2 |
|---|---|---|
| TEOS | 22.39 ml | 66.99 ml |
| H$_2$O | 77.4 ml | 77.4 ml |
| Ethanol | 309 ml | 309 ml |
| NH$_4$OH | 3 ml | 3 ml |
| pH | 11.7 | 11.7 |

As apparent from the above description, the spherical silica particles prepared by the Stober's method have disadvantages in that they are too low in their weight fraction (less than 4 wt %) and are prepared using the very expensive TEOS as the reactant, whereas the silica particles prepared by the stober's method have advantages in that they are highly uniform in their size and very high in their purity.

The present invention includes growing relatively inexpensive and commercially available silica particles (such as fumed or colloidal silica particles) as a seed by the hydrolysis and polycondensation of TEOS, thereby increasing the weight fraction of the resulting grown particles to a range of 5 to 10 wt % and improving the low weight fraction problem of the stober's method. Also, the present invention includes the use of the relatively inexpensive silica particles as a seed, thereby decreasing the amount of the expensive TEOS used for the particle preparation. Accordingly, the present invention allows the economical preparation of the spherical silica particles having a uniform size and a very high purity that are the advantages with the Stober's method.

In addition, the present invention includes displacing the alcohol solvent containing the silica particles dispersed therein with water using the vacuum distillation and the centrifugation, and then hydrothermally treating the resulting aqueous dispersion of the silica particles in the autoclave. By these procedures, the present invention can prepare the silica slurry capable of resulting in an increase in the removal rate and planarization degree of the wafer surface.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a silica slurry for wafer polishing, comprising the steps of:
 combining an aqueous dispersion of silica particles as a seed, tetraethylorthosilicate as a precursor, an alcohol solvent, and a base;
 growing the seed silica particles by hydrolysis and polycondensation of the precursor tetraethylorthosilicate;
 displacing the alcohol solvent containing the grown silica particles dispersed therein with an aqueous solution by vacuum distillation; and
 hydrothermally treating the resulting aqueous dispersion of the silica particles.

2. The method of claim 1, in which the silica particles are selected from the group consisting of fumed silica particles and colloidal silica particles.

3. The method of claim 1, in which the vacuum distillation is carried out by maintaining or increasing a surface charge of the silica particles using a mixture of water and ammonium hydroxide.

4. The method of claim 1, in which the hydrothermal treatment step is carried out for 1 to 2 hours in an autoclave.

5. The method of claim 1, in which the alcohol solvent is selected from the group consisting of methyl alcohol, ethyl alcohol, propanol and butanol.

6. The method of claim 1, in which the silica particles used in the combining step are first pretreated by
 (a) dispersing the particles in water to form agglomerate particles;
 (b) allowing the agglomerate particles to settle in the dispersion;
 (c) crushing, using a ball mill and a paint shaker, the agglomerate particles in the dispersion; and
 (d) subjecting the dispersion to sonication.

* * * * *